3,384,510
SHEATHED ELECTRIC HEATING ELEMENTS
Alben C. Boggs, Pittsburgh, Pa., assignor to Edwin L. Wiegand Company, Pittsburgh, Pa.
No Drawing. Filed Jan. 26, 1965, Ser. No. 428,196
2 Claims. (Cl. 117—219)

ABSTRACT OF THE DISCLOSURE

A fired coating on the metallic sheath of an electric heating element to enhance the surface emissivity thereof, including a first coating of vitreous enamel and a second coating of a water solution of sodium silicate.

---

My invention relates to sheathed electric heating elements, more particularly to heating elements having a coating applied to the sheath to enhance the surface emissivity thereof, and the principal object of my invention is to produce new and improved heating elements of this character.

The heating element to which my invention is applied may be of any well known sheathed construction and per se forms no part of my invention. Thus, the invention may be applied to strip heaters, such as shown in Letters Patent 1,614,330, issued to E. L. Wiegand; tubular heaters such as shown in Letters Patent 2,272,282, issued to E. L. Wiegand; and other types of sheathed heaters. Letters Patent 2,376,840, issued to E. L. Wiegand illustrates a method of producing a tubular heater and other patents may be cited to illustrate methods of making other types of sheathed heaters.

Usually when the sheathed heater was fully produced, including formation to a desired configuration especially in the case of tubular heaters, application of a coating to the exterior of the sheath was found desirable in certain applications. A vitreous enamel coating was heretofore employed with considerable success.

One method in the process of coating sheathed heaters included the steps of mixing finely divided ceramic material with suitable fluxes, fillers and perhaps other materials in suitable proportions and adding water and milling the mixture to break down the particle size of the ingredients and to achieve a suitable blend of the materials.

The blended mixture may then be sprayed upon the heater sheath, or the later may be dipped into the mixture. The heater may then be dried in the atmosphere to liberate practically all free moisture, and the heater then placed in an oven and fired to a temperature consistent with the mixture applied, usually in the range of about 900 to 1500° F.

The resulting vitreous enamel coating has a high surface emissivity when applied to the steel sheath of heating elements. However, when moisture is present, uncoated pin holes in the ceramic coating allow rusting of the sheath to develop. The number of such pin holes can be reduced by multiple coatings and firings, but this greatly adds to the cost of the heater because apart from the additional time and material consumed in each coating, further expense is encountered by reason of the fact that each coating must be fired on before a successive coating is applied.

My invention provides a seal which, when applied to the vitreous enamel coating, will effectively cover the surface coating imperfections and result in a resultant coating that is capable of withstanding exposure to moisture and humidity without rutsing. Thus, in most cases only a single ceramic coating is necessary.

A commercially available sodium silicate solution 40–42° Baumé concentration may be used, but since this is syrupy in consistency, it is preferable to add water to the solution. I have found it preferable to increase the water content of the commercially available sodium silicate solution to the extent that approximately 30% sodium solution by volume is added to water to produce a working solution. The heater is dipped into this water solution, or the latter is sprayed into the heater sheath, over the ceramic coating and the heater is then dried in the atmosphere to remove free moisture.

When substantially dry, the ceramic coating has a thin coating of sodium silicate and the latter coating makes practically no change in the appearance of the ceramic coating. At low temperatures this sodium silicate coating is water soluble, but when fired the solubility of this coating is noticeably reduced. In the application herein disclosed, stability of this silicate solution is gained by the complex silicate solutions that result when the seal coating is fired over the ceramic coating.

Thus, I have found it preferable to place the atmosphere dried sodium silicate coated heating element in a furnace and fire the seal coating to about 1250° F., or higher. The firing chemically changes the sodium silicate coating to decrease water solubility to a satisfactory level. The firing also possibly chemically combines the sodium silicate coating with the ceramic coating. In any event, it has been found that the fired sodium silicate coating completely, or practically completely, seals any pin holes in the ceramic coating and thereby satisfactorily reduces rusting and other deterioration of the steel sheath of the heating element.

As above noted, it is preferable to increase the water content of the commercially available sodium silicate solution, although I have found that the commercially available form may be used without addition of water. However, because of its syrupy consistency it is more difficult to efficiently dip or spray the heating element and this becomes of importance in commercial production. It has also been found that a fired coating of commercially available sodium silicate solution results in bubbling or in the forming of a seal coating which detracts from the appearance of the finished article. However, apart from these handicaps, the seal coating resulting from use of the commercially available sodium silicate solution in most cases forms a satisfactory seal for the ceramic coating.

In view of the foregoing it will be apparent to those skilled in the art that I have accomplished at least the principal object of my invention and it will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. The method of treating a metallic sheathed electric heating element which comprises:
    applying a fluid coating of vitreous enamel to the sheath of said heating element,
    drying said coating,
    applying a second coating in the form of a water solution of sodium silicate to said first mentioned coating,
    and subjecting said heating element sheath to sufficient heat to fire said coatings.

2. The method of treating a metallic sheathed electric heating element which comprises
    applying a coating in the form of a water solution of vitreous enamel to the sheath of said heating element,
    drying said coating to drive off free moisture therein, subjecting said element sheath to sufficient heat to fire said vitreous enamel coating, applying a second coating in the form of a water solution of sodium silicate to said fired, first-mentioned coating, drying said second coating to drive off free moisture therein, and subjecting said element sheath to sufficient heat to fire said second coating to said first-mentioned coating.

References Cited

UNITED STATES PATENTS

| | | |
|---|---|---|
| 2,477,121 | 7/1949 | Ganci _____ 117—23 X |
| 2,491,965 | 12/1949 | Ganci _____ 117—70 X |
| 2,836,698 | 5/1959 | Fry. |

FOREIGN PATENTS 593,795  10/1947  Great Britain.

RALPH S. KENDALL, *Primary Examiner.*